Inventor
CHARLES LOHMAN.
By A. B. Bowman
Attorney

Patented Apr. 23, 1929.

1,710,366

UNITED STATES PATENT OFFICE.

CHARLES LOHMAN, OF CHULA VISTA, CALIFORNIA.

HAYRAKE.

Application filed June 26, 1923. Serial No. 647,818.

My invention relates to hay rakes, more particularly adapted for bunching purposes, and the objects of my invention are: first, to provide a rake of this class which is so constructed that it will collect hay, straw or the like and leave the same in large, neat and well rounded bunches, cocks or stacks when dumped by the rake portion; second, to provide a rake of this class which by reason of its construction will collect a greater quantity of hay, straw or the like at the middle portion thereof than at the ends, thus reducing to a minimum the liability of the hay or the like loosing out at the wheels when bunching or raking ordinarily; third, to provide a rake of this class in which the frame, operating mechanism and the like, are normally raised a considerable distance above the axle and will not, therefore, interfere with the hay, straw or the like; fourth, to provide a rake of this class in which the frame is so supported relatively to the rake portion that its weight and the weight of the driver seated thereon will, to a great extent, counterbalance the rake portion and facilitate the tilting operation of the same; fifth, to provide a rake of this class which, by reason of the counterbalancing of the rake portion of the machine, will substantially dump itself or materially aid in the dumping of the hay, straw or the like when the rake portion is substantially filled with the same and when the lock is released; sixth, to provide a novelly constructed hay rake of this class, and seventh, to provide a rake of this class which is very simple and economical of construction, durable, efficient, practical, easy to operate, and which will not readily deteriorate or get out of order.

Figure 1:
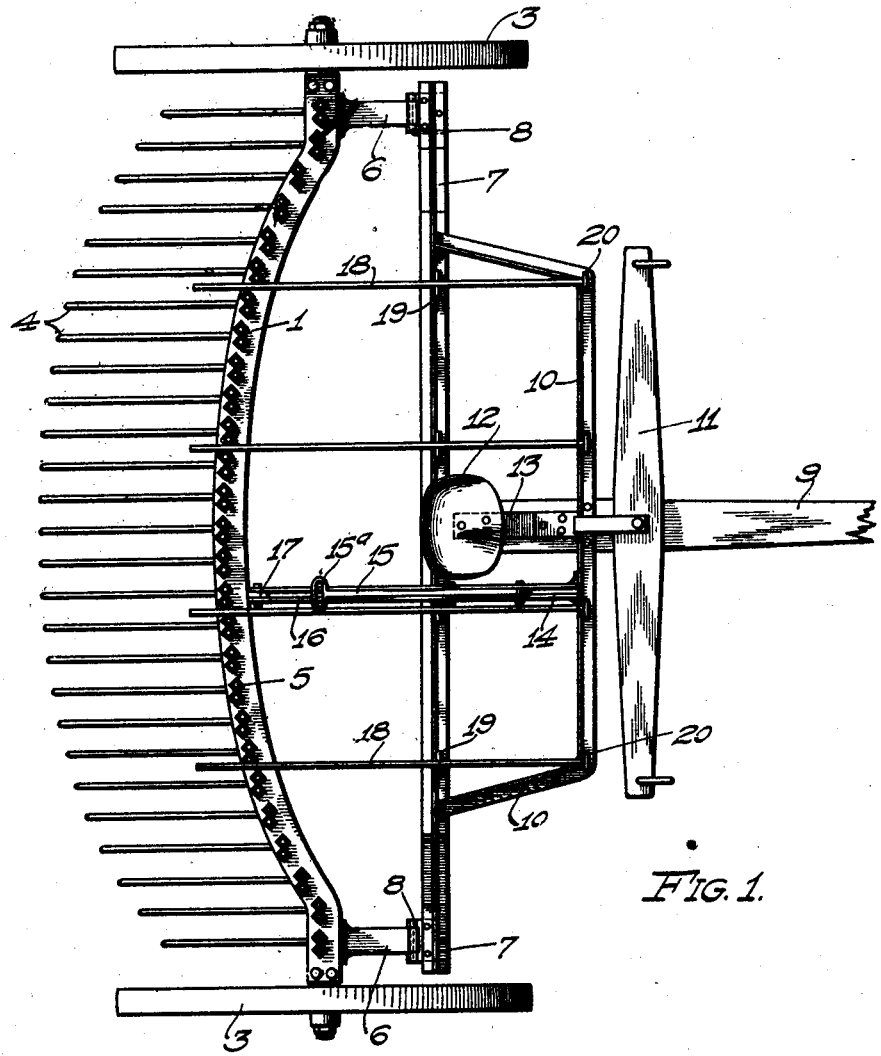
Figure 2:
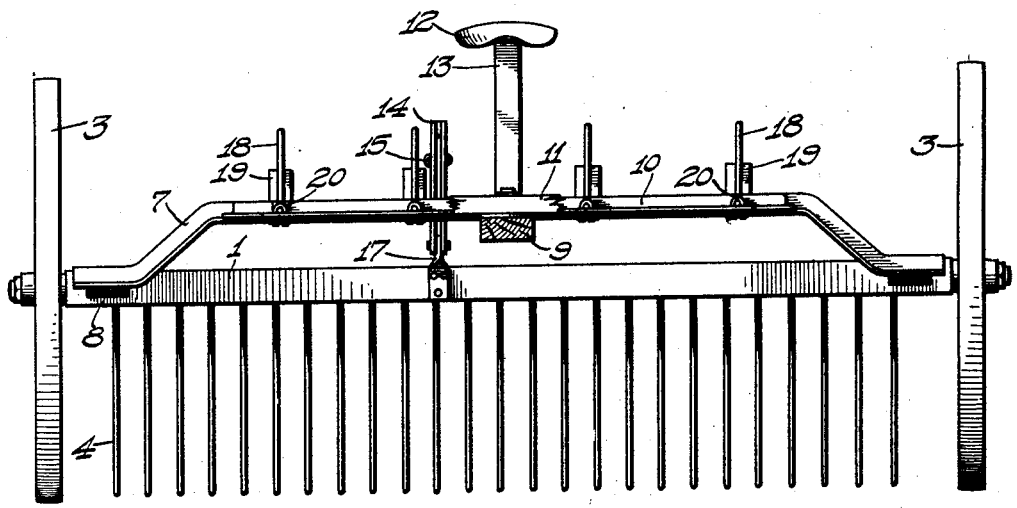

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, in which:

Figure 1 is a plan view of my rake with the draft member thereof shown fragmentarily; Fig. 2 is a front elevational view thereof with the draft and other members partially broken away and in section to facilitate the illustration, and Fig. 3 is a side elevational view thereof with the draft member partly broken away and with one wheel removed to facilitate the illustration, and showing by dotted lines certain shifted positions of various members.

Like characters of reference refer to similar parts and portions throughout the several views of the drawings.

The rake teeth supporting frame 1 serves as the axle, there being provided axle members 2 at each end thereof on which are revolubly mounted the supporting wheels 3. The supporting frame 1 when in the normal raking position is laterally offset to a great degree in curved form, the offset extending from near the ends to the middle portion thereof, and being greatest at said middle portion. To the supporting frame 1 and extending backwardly and downwardly therefrom in spaced relation with each other are the curved rake teeth 4, which are secured at their upper ends to the supporting frame, which is preferably angular in cross section, by means of the U-bolts 5. It will be noted that the general contour in plan of the rear portions of the rake teeth 4 relatively to each other is convex or that the same are arranged in a curved line relatively to each other, the middle rake teeth extending farthest backwardly. At each end of the supporting frame 1 and extending forwardly therefrom are the supporting arms 6, at the forward ends of which are pivotally supported the hinge members 8, which are secured near the ends of the frame member 7, which frame supports the operator and the draft member 9 to which it is secured. The frame member 7 is offset upwardly at its middle portion forming a bridge to increase the space below the same, particularly when the case is lowered, as shown by dotted lines in Fig. 3. The draft member 9 is reinforced relatively to the frame member 7 by means of the reinforcing member 10, as shown best in Fig. 1 of the drawings. Forward of the reinforcing member 10 and on the draft member 9 is pivotally mounted the double tree 11. Above the frame member 7 is positioned the seat 12, which is supported on the draft member 9 by means of the resilient seat support 13, as shown in Fig. 3 of the drawings. Secured to the frame member 7 and the reinforcing member 10 and extending above the same are the spaced apart supports 14, positioned to one side of the seat 12. Between said supports is pivotally mounted the one end of the lever 15 intermediate the ends of which are connected a pair of links 16 at their one end, the other ends of which links are pivotally connected to a lug 17 secured near the middle portion of the rake teeth supporting frame 1. The lever 15 is provided with a loop 15ᵃ at its free end to facilitate the shifting of the same. A bolt 16ᵃ is secured to and between the links 16, and serves as a stop for the low or locked position of the lever 15. It will be noted that with the lever in the locked position, as shown in Fig. 3 of the drawings, the pivoted connection of the lever 15 and links 16 is positioned beyond a straight line extending between the pivoted mountings of the lever 15 and links 16, thus locking the lever in position. A plurality of rake cleaning members 18 laterally spaced from each other and adapted to extend between certain rake teeth 4 to facilitate the removal of hay, straw or the like therefrom, are supported intermediate their ends on supports 19 secured on the frame member 7, and are secured at their one end to the reinforcing member 10 by means of U-bolts 20.

Figure 3:
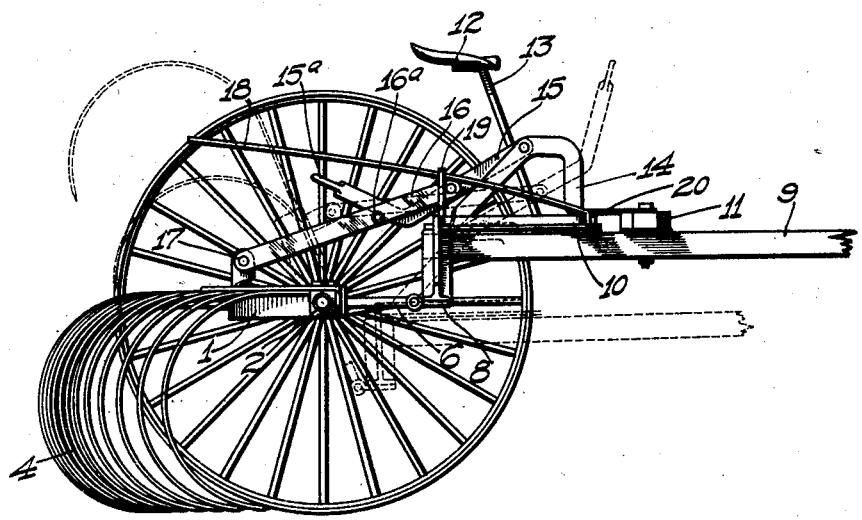

It will be noted that when the rake portion has collected a certain amount of hay, straw or the like, the rake teeth will tend to be raised or shifted about the axis of the wheels to the position shown by dotted lines in Fig. 3 of the drawings, said shifting being facilitated by the counterbalancing weight of the forward frame and the weight of the driver. The dumping or stacking mechanism, however, is so arranged that the lever 15 must first be shifted upwardly and forwardly to release and raise the rake members. The forward frame will then assume the position shown by dotted lines in Fig. 3 of the drawings.

It is obvious from this construction as shown in the drawings and described in the specification that there is provided a hay rake aimed at and set forth in the objects of the invention, and though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent, is:

1. A hay rake, including a frame provided with straight portions at its opposite ends and with an offset, curved central portion, wheels revolubly mounted at the opposite ends of said frame in axial alinement with said straight portions, and a plurality of spaced apart, equal length rake teeth secured to said supporting frame and extending backwardly and downwardly and forwardly therefrom in semi-circular form.

2. A hay rake, including a frame provided with straight portions at its opposite ends and with an offset, curved central portion, wheels revolubly mounted at the opposite ends of said frame in axial alinement with said straight portions, a plurality of equal length, semi-circular, spaced apart rake teeth secured to said supporting frame, a centrally arched frame member pivotally connected to and extending forwardly some distance from the supporting frame, and a lever and link means in connection with said frame member and said supporting frame for shifting the latter.

3. A hay rake, including a frame provided with straight portions at its opposite ends and with an offset, curved central portion, wheels revolubly mounted at the opposite ends of said frame in axial alinement with said straight portions, a plurality of equal length, semi-circular, spaced apart rake teeth secured to said supporting frame, a centrally arched frame member pivotally connected to and extending forwardly some distance from the supporting frame, a lever and link means in connection with said frame member and said supporting frame for shifting the latter, and an operator's seat mounted on said centrally arched frame.

4. In a hay rake, a centrally curved, backwardly offset supporting frame provided with straight ends, wheels revolubly mounted at the opposite ends of said supporting frame in alinement with said straight ends, semi-circular, rake teeth secured to said supporting frame and extending backwardly and downwardly therefrom, and a centrally arched frame pivotally connected in front of and to said supporting frame.

In testimony whereof, I have hereunto set my hand at San Diego, California, this 20th day of June, 1923.

CHARLES LOHMAN.